(12) United States Patent
Wamstad et al.

(10) Patent No.: US 9,206,990 B2
(45) Date of Patent: Dec. 8, 2015

(54) DEVICE AND METHOD FOR ABSORBING WATER FROM GAS

(75) Inventors: Jonas Wamstad, Uppsala (SE); Fredrik Edstrom, Uppsala (SE)

(73) Assignee: AIRWATERGREEN AB, Uppsala (SE)

( * ) Notice: Subject to any disclaimer, the term of this patent is extended or adjusted under 35 U.S.C. 154(b) by 204 days.

(21) Appl. No.: 13/510,308

(22) PCT Filed: Nov. 19, 2010

(86) PCT No.: PCT/SE2010/051279
§ 371 (c)(1),
(2), (4) Date: May 17, 2012

(87) PCT Pub. No.: WO2011/062554
PCT Pub. Date: May 26, 2011

(65) Prior Publication Data
US 2012/0227582 A1    Sep. 13, 2012

(30) Foreign Application Priority Data

Nov. 19, 2009 (SE) ........................ 0950878
Oct. 28, 2010 (SE) ........................ 1051128

(51) Int. Cl.
*B01D 53/28* (2006.01)
*F24F 3/14* (2006.01)
*B01D 53/26* (2006.01)

(52) U.S. Cl.
CPC ............ *F24F 3/1411* (2013.01); *B01D 53/261* (2013.01); *B01D 2253/102* (2013.01); *B01D 2253/106* (2013.01); *B01D 2253/108* (2013.01); *B01D 2253/112* (2013.01); *B01D 2259/4508* (2013.01)

(58) Field of Classification Search
CPC .................. B01D 2253/102; B01D 2253/106; B01D 2253/108; B01D 2253/112; B01D 2259/4508; B01D 53/261; F24F 3/1411
See application file for complete search history.

(56) References Cited

U.S. PATENT DOCUMENTS

| 2,083,732 | A | * | 6/1937 | Moore et al. ................ 96/126 |
| 2,138,689 | A | | 11/1938 | Altenkirch |
| 3,568,406 | A | * | 3/1971 | Dynes ........................ 95/115 |
| 3,683,591 | A | * | 8/1972 | Glav ............................ 95/93 |
| 4,342,569 | A | * | 8/1982 | Hussmann ................... 95/124 |
| 4,584,842 | A | * | 4/1986 | Tchernev ................... 62/106 |
| 4,793,143 | A | * | 12/1988 | Rhodes ....................... 62/93 |
| 5,926,969 | A | * | 7/1999 | Crawford et al. ............. 34/80 |
| 7,264,649 | B1 | * | 9/2007 | Johnson et al. .............. 95/10 |
| 2002/0189448 | A1 | | 12/2002 | Spletzer et al. |
| 2007/0079623 | A1 | * | 4/2007 | Inaba et al. ................ 62/260 |
| 2011/0056220 | A1 | * | 3/2011 | Caggiano ................... 62/94 |
| 2013/0061751 | A1 | * | 3/2013 | Martin et al. .............. 95/126 |

FOREIGN PATENT DOCUMENTS

| CN | 101100866 A | 1/2008 |
| DE | 101 07 981 A1 | 8/2002 |
| DE | 10 2006 038 983 A1 | 2/2008 |
| RU | 2230858 C2 | 6/2004 |
| WO | 99/07951 A1 | 2/1999 |
| WO | 99/66136 A1 | 12/1999 |

OTHER PUBLICATIONS

Translation of DE 10107981, Beil, Aug. 29, 2002.*
International Search Report, dated Mar. 2, 2011, from corresponding PCT application.

* cited by examiner

*Primary Examiner* — Christopher P Jones
(74) *Attorney, Agent, or Firm* — Young & Thompson

(57) ABSTRACT

The present invention relates to a device, a method and the use of the same for production or purifying of water. Present invention is based on the use of hygroscopic materials and heating thereof.

21 Claims, 4 Drawing Sheets

DEVICE AND METHOD FOR ABSORBING WATER FROM GAS

FIELD OF TECHNOLOGY

The present invention relates to a device, a method and the use of the same for extraction of water from gases or purifying of water.

BACKGROUND

The access to clean water is vital to humans and animals and water is today a shortage commodity in large parts of the world due to increased population, changes in the way we live, increased use of water for irrigation.

Primary sources for fresh water are ground water, rivers and lakes. Here the water is free from salt and needs only to be purified from dirt and microbes through low energy demanding processes to be applicable for drinking water or in agriculture. Countries that lack the possibility to further explore the ground water and which lack other exploitable natural fresh water reserves must get their fresh water from the sea. Before the seawater can be used by humans as drinking water or for irrigation in agriculture it must first be desalted using an energy demanding desalting process. The energy source is today based on fossil fuels which cause environmental damages in the form of pollution and enhanced global warming. Additionally, the desalting process produces high salt concentrated rest products which are very toxic for both plants and animals.

An alternative way of circumventing the lack of access to fresh water is to take advantage of the water found in the air. There are today several known and available techniques to condense water from air. These techniques are usually based on hygroscopic material which binds the moisture in the air. The water can then be retained from the hygroscopic material in liquid form by using heating and cooling in various cycles. The heating and cooling respectively of the air in these processes demand relatively large amount of energy. They are therefore not a competitive alternative to large scale production of fresh water from sea water.

Prior art contains several different approaches to extract water from air. DE102006038983 relates to a method using a fluid sorbent with a hygroscopic salt and a pressure generating unit. CN101100866 and RU2230858 both describe systems that require various cooling systems while WO9907951 relates to a system with a vacuum pump that discharges steam to a condenser. U.S. Pat. No. 2,138,689 relates to a method for gaining water from the atmosphere by exposing wood to air during the night. The wood is then placed in a closed space where the air and the wood are warmed up by the sun. The warmed air is saturated with moisture and the air flows through a channel to a condenser and the liquidized water is then collected. The air returns to the closed space to take up more moisture.

SUMMARY OF THE INVENTION

The present invention relates to a device, the use of the device and a method for the production and purifying of water. The invention reduces considerably the amount of energy needed for the processes to condense water from air. The present invention take advantage of the thermodynamic properties of the air, for example its ability to maintain water in gas phase under various pressures in sealed containers. Since the process needs substantially less energy than today's methods to condensate water from air the energy cost per unit produced water decreases.

When the container is open the hygroscopic material is exposed to continuous or discontinuous gas flow and thereby in constant contact with moisture which is absorbed by the material. The amount of water the hygroscopic material can absorb depends on for example the properties of the material, temperature and the relative humidity in the gas.

One aspect of the present invention is a device for extraction of water from gas comprising a container with at least one sealable opening, at least one lid, at least one hygroscopic material and an energy delivery device wherein the container is made of heat conducting material.

In another embodiment the walls of the container is totally or partly made of or coated with a hydrophobic material.

In yet another embodiment a fan or a pump facilitates a gas flow into the container.

Still another embodiment comprises an energy delivery device using the microwave oven principle or the heat from electricity through a resistive metal wire or solar energy.

Another embodiment comprises a control mechanism for the sealing of the lid. The control mechanism is responsive to the amount of absorbed water in the hygroscopic material and is in connection with the energy delivery device.

In another embodiment the lid is a check valve which could be opened by a gas flow, facilitated for example by a fan or a pump or wind, and closed when the gas flow stops.

A second aspect of the present invention relates to the use of the device for watering, irrigation, water production, indoor climate facilities, air conditioning or dehumidification.

A third aspect of the present invention relates to a method for extracting water from gas using a container which comprises at least one opening, at least one hygroscopic material, at least one energy delivery device and at least one lid comprising:

providing gas containing water to the container
absorbing water onto or into the hygroscopic material
sealing the container with the lid
heating the hygroscopic material until the gas in the container is saturated with water in gas phase
continuing to heat until the remaining absorbed water in the hygroscopic material liquefies without vaporizing first In another embodiment the provision of gas is facilitated via a fan or a pump or wind.

In another embodiment the pressure in the sealed container is reduced.

In yet another embodiment, the gas is cooled in a continuous or discontinuous manner to maintain a temperature difference between the gas and the water absorbed in or to the hygroscopic material. The cooling can be accomplished actively using a cooling device or passively through the heat conductive material that the container is made of.

In another embodiment the container is made of non-insulating material and/or heat conducting material and in another embodiment the walls of the container is wholly or partly made of or coated with a hydrophobic material. The walls and the bottom of the container could in one embodiment be constructed in such a way that liquidized water merges into larger droplets and then assembles to facilitate the draining of the water.

The manoeuvring of the lid could in one embodiment be controlled by a mechanism. This mechanism is preferably also connected to the hygroscopic material in order to recognize when the lid should be opened or closed.

DETAILED DESCRIPTION OF THE INVENTION

The term "lid" in the present invention should be interpreted as a device that covers, shuts, closes and/or seals an opening. The term also includes valves such as check valves.

In the present application the terms "adsorption" and "adsorbed" includes all forms of sorption.

In the present application the term "container" is not restricted to a geometrical form or size and includes, but is not restricted to, terms such as tube, pipe, box, tank and bowl.

In the present application the terms "in connection with" and "connected to" refers to physical as well as optical or digital connections.

The present invention is based on that a hygroscopic material confined in a container absorbs water from the surrounding gas, preferably air, and preferably to the point of saturation. Thus, after having allowed the hygroscopic material to absorb water, the container is sealed using a lid or any suitable cover and the hygroscopic material is then heated. The sealing should be performed in such a way that when the gas volume in the sealed container does not expand during heating. The production process is driven by the difference in vapour pressure of the water in the gas and the water absorbed in the hygroscopic material. The amount of water released from the hygroscopic material to the surroundings can be described by:

$$dm/dt = CA\Delta P = CA(P_1(T_1) - P_2(T_2))$$

where C is a material constant, A is the contact surface between the gas the hygroscopic material and P is the vapour pressure. When the gas is saturated, i.e. 100% relative humidity, the vapour pressure of the absorbed water in the hygroscopic material could still be even higher. The higher vapour pressure and the saturation of the gas makes the absorbed water liquefies. The present invention lowers the amount of energy needed since instead of vaporizing the absorbed water the present invention only requires the energy to break the bonding between the water and the hygroscopic material. This is a result of that vaporizing requires both energy to break the bond between the absorbed water and the hygroscopic material and energy to vaporize the water.

Unlike prior art the present invention is therefore not dependent on an internal circulation of air or cooling systems to function. The use of non-insulating or heat conductive material in the present invention makes it unnecessary to use a cooling system.

Figure 1:
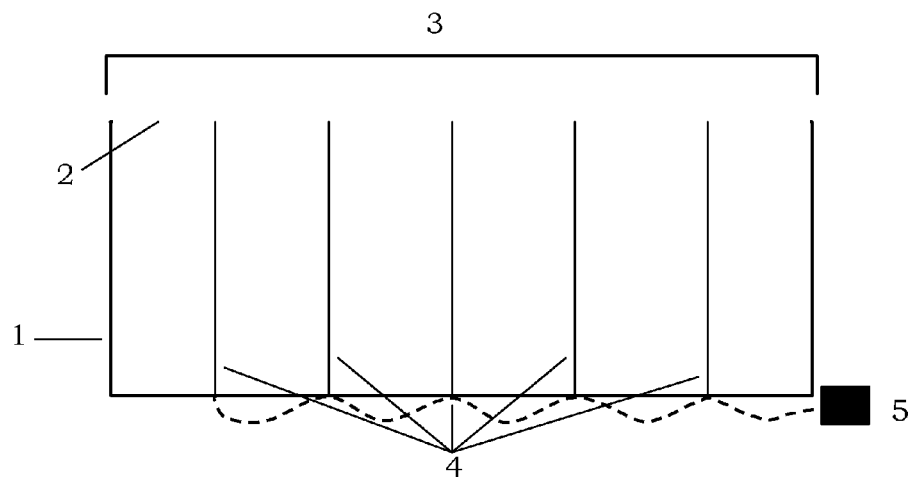
FIG. 1. Cross-section of a container according to the present invention where the container is opened.
Figure 2:
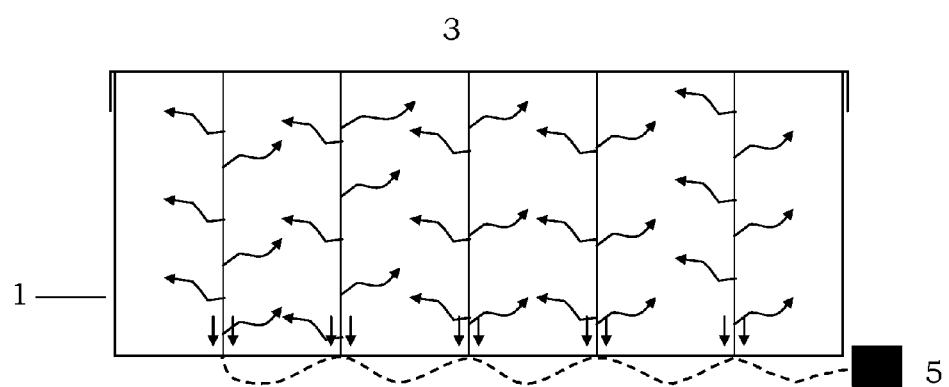
FIG. 2. Cross-section of a container according to the present invention where the container is closed and vapour is produced and absorbed water is liquefied.

During the heating of the hygroscopic material the water absorbed on or to the material will vaporize. When the surrounding gas is saturated with moisture additional heating will cause some of the absorbed water to go from absorbed to free liquid water, FIG. 2. Additionally, by having walls of heat conducting material (or non-insulating material) the vaporized water could condense on the walls, shifting the equilibrium, facilitating more water to be vaporized from the hygroscopic material. The walls of the container can be made of but not limited to metals or metal alloys.

In another embodiment of the present invention, the device contains a pump in order to reduce the pressure in the container when it is sealed. The pump could replace the energy delivery or the heating device or could be a complement to the energy delivery or the heating device. When the lid is sealed on the container, the pump would reduce the pressure in the sealed container in order to shift the vapour pressure balance between the gas in the container and the hygroscopic material. The water would then condense and can easily be collected. The pressure in the sealed container may be reduced using a pump or any other suitable means. If the device comprises an energy delivery device as well, the reduction of pressure could be done prior, during or after heating the hygroscopic material. The energy delivery device may further comprise a microwave generator or resistive heating device or a solar absorber unit.

If the temperature surrounding the container is low the temperature of the container, and thereby the gas, will be low and the gas in the container will not be capable of maintain as much water and will instead cause a lower vapour pressure when saturated. A high temperature in the hygroscopic material is preferable to create a higher vapour pressure. Further, the lower the gas temperature is the faster the process goes and the more water can be produced.

The energy added to the adsorbed water in the hygroscopic material could be in the form of heat as mentioned above but also in the form of microwaves or ultrasound or a combination thereof. The microwave or ultrasound delivery device can be arranged close to the hygroscopic material or on the side walls of the container or on the lid.

It is preferred to have as big contact surface as possible between the hygroscopic material and the gas. The material could therefore be in the form of or having a structure of being porous, in the form of lamella, layers, crickled, grains or granules or combinations of these.

The present invention comprises a container 1 with at least one opening 2 that can be sealed using a lid 3 or in any other suitable way. The lid could for example be a check valve. At least one hygroscopic material 4 is found inside the container and/or in the lid. The container including the lid could be made of a non-transparent material; however a small window for observation may be arranged in the lid or in the walls of the container. The hygroscopic materials could be made of the same material or a mixture of various hygroscopic materials. An energy delivery device 5 is used to heat the hygroscopic material inside the sealed container. This device 5 may also function as a cooling device but is herein referred to as the energy delivery device. The energy delivery device could be manoeuvred using electricity, fuel cells, solar energy or in any other suitable way and the heat could be supplied via electricity, microwaves (for example via the microwave oven principle) or via solar energy. The energy delivery device could also be connected to a lid control mechanism 7 to optimize the process of when the lid should be opened and closed and when the energy delivery procedure should start. Additionally, the container is preferably constructed in such a way that the gas volume inside a sealed container remains substantially constant during energy delivery. This may be accomplished by securing or locking the lid after closing or using a check valve as a lid.

Figure 4:
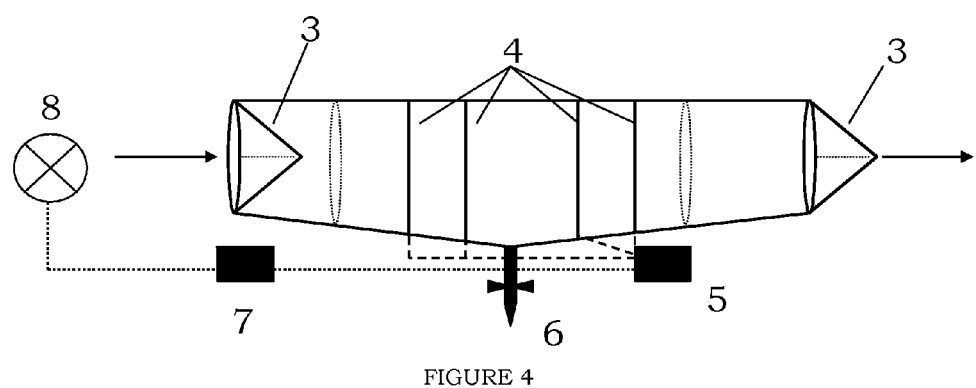
FIG. 4. Cross-section of a container according to the present invention where the container comprises check valves and a fan or a pump.

In other words, the control mechanism 7 preferably controls the lid 3 and the energy delivery device 5. When a fan or a pump is used, the control mechanism may be connected to the fan or the pump in a suitable way to control said fan or pump, FIG. 4. Preferably, the lid should be closed and sealed when the hygroscopic material is saturated with water. Further, the control mechanism is preferably connected to the energy delivery device and the hygroscopic material in order to control the energy delivery and cooling. The connection could be in the form of, but not limited to, physical connections and/or various sensors. The sensors may function to control the temperature in the hygroscopic material to optimize the start and finish of the energy delivery, but also to control the temperature in the material to adjust it in respect to the amount of adsorbed water, surrounding temperature and so on. The sensors in the hygroscopic material are preferably sensitive to temperature or hygroscopic level. When a preset level is reached the control mechanism activates the closing or the opening of the lid and activates the energy delivery or cooling. If a fan or a pump 8 is used the activation and deactivation of the fan or the pump is preferably controlled via the control mechanism. For example, when a certain hygroscopic level is reached in the hygroscopic material, the fan starts. This could further be used when the lid is a check valve and the activation and deactivation of the fan/pump opens and closes the check valve, FIG. 4.

Figure 3:
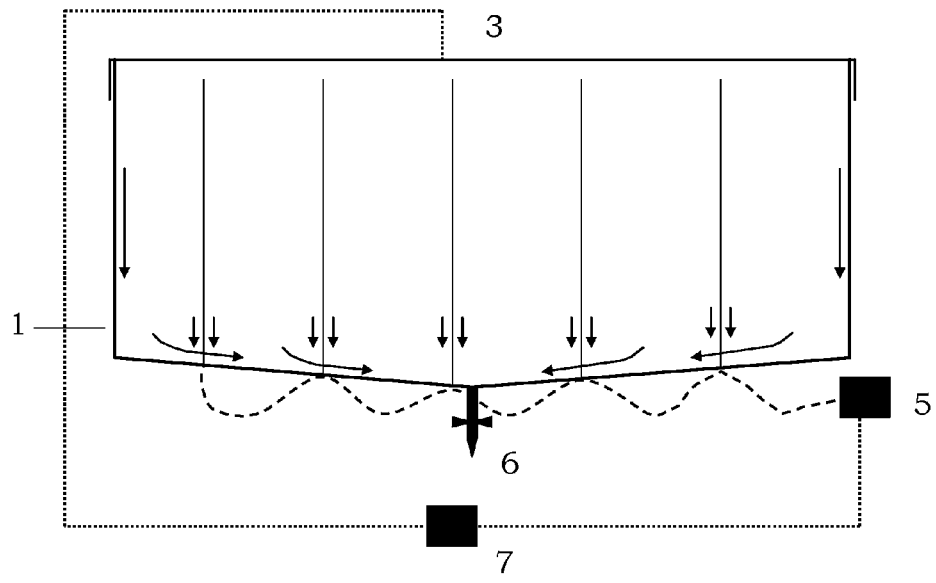
FIG. 3. Cross-section of a container according to the present invention comprising draining element and control mechanism.

The walls and the bottom of the container should preferably be constructed in such a way that the liquidized water is assembled, FIG. 3. This may be accomplished by having grooves, trenches, channels or the like in or along the walls of the container, they may further continue along the bottom plate of the container towards an assembling spot. These grooves, trenches or channels could be made of hydrophobic material. The bottom plate could be constructed in such a way that all the water from the walls and from the hygroscopic material is assembled. This could be achieved by having the bottom lean into one or more spots, FIG. 3. The container has preferably a draining element 6 which could be but is not limited to a tap, faucet or an outlet.

Figure 5:
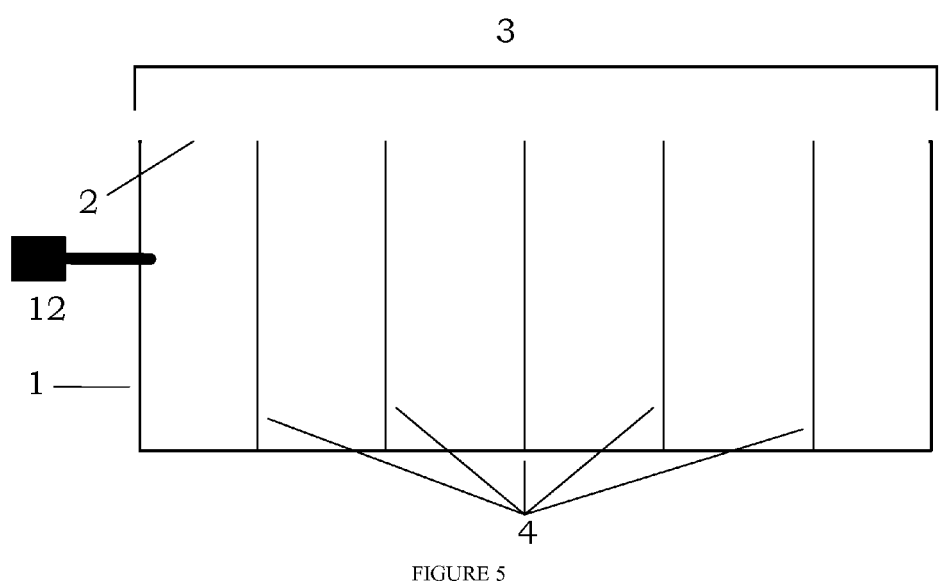
FIG. 5. Cross-section of a container according to the present invention where the container comprises a pump.

FIG. 5 shows the present invention where a pressure reduction device 12 is arranged. This could be a pump for example. The location the inlet of the pump could be arranged at the bottom of the container, in the walls of the container or in the lid. There could also be more than one pump or more than one inlets, for example one, two or three pumps or inlets, preferably arranged at different locations in the container. In one embodiment the fan or the pump 8 and the pressure reduction device 12 are the same.

The hygroscopic material is preferably placed in the container and/or in the lid. The material may be placed along the walls of the container and/or preferably separated from the walls. Preferably, the container is be made of a heat conducting and/or non-insulating material. Further, the container, including the lid, is preferably constructed in such a way that the temperature difference is as big as possible between the gas and the hygroscopic material.

Figure 6:
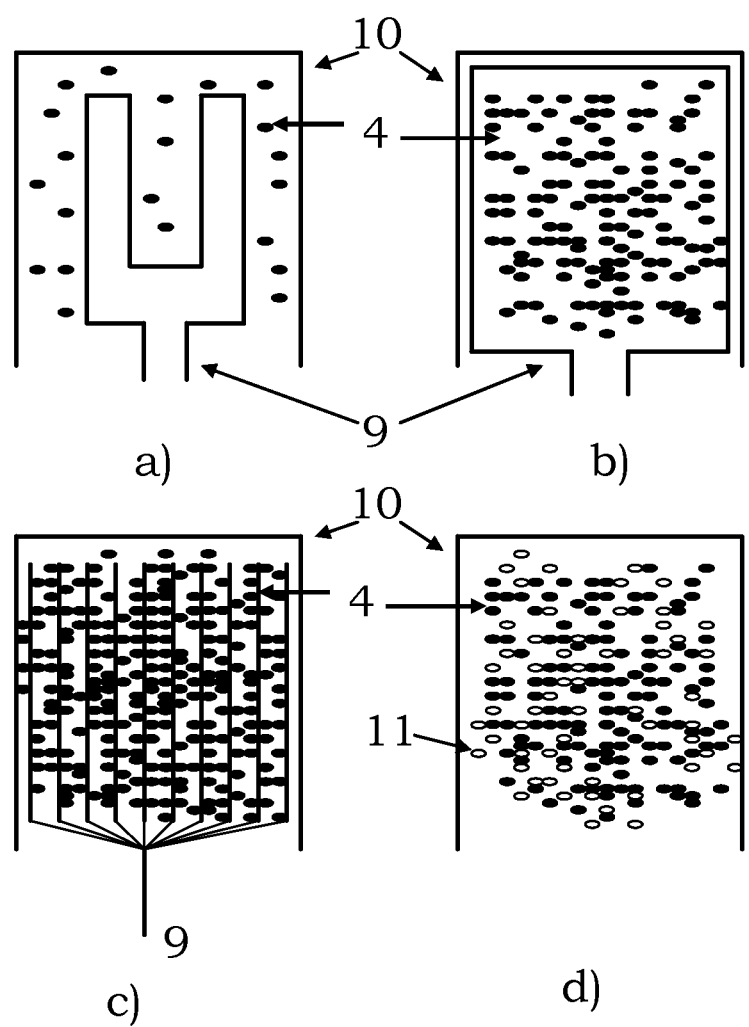
FIG. 6. Cross-section of a hygroscopic material.

The hygroscopic material may be arranged in a frame 10 and the energy delivery device may be partly arranged in the hygroscopic material, here illustrated as black spots 4. The end part of the energy delivery device 9 arranged in the hygroscopic material may have different shape as seen in FIG. 6. In FIG. 6a the end part is Y or fork shaped, while in 6b the end part 9 is a substantially flat rectangular surface and in 6c the end part comprises several wires. By placing the end part 9 in the hygroscopic material the heating will become much more efficient and more evenly distributed than if the whole container is heated or if for example only one end of the hygroscopic material is heated. In FIG. 6d small metal or heat conducting particles 11 are arranged in order to maintain the heat and/or conduct the added energy or heat to the hygroscopic material. The hygroscopic material may comprise molecular sieves, active carbon, zeolite, silica gel, LiCl, CaCl, $NaNO_3$, wood, sulphates or any suitable material known to a person skilled in the art or combinations thereof.

The present invention is aimed at extracting water from gas, preferably air, to either produce water or remove the water from the gas. The latter could be used for example, but not limited to, for dehumidification of indoor environments or in air-conditioning devices.

The invention claimed is:

1. A device for extraction of water from gas comprising a container with at least one sealable opening, at least one lid, at least one hygroscopic material and an energy delivery device, wherein the container is made of a heat conducting non-transparent material and wherein the energy delivery device is arranged in the hygroscopic material, wherein the hygroscopic material is arranged in a frame, and wherein the hygroscopic material is separated from walls of the container and surrounded by the gas, allowing water in the hygroscopic material to be vaporized to the surrounding gas when heated by the energy delivery device.

2. The device according to claim 1 wherein the energy is in the form of heat.

3. The device according to claim 1 wherein the energy delivery device is a heating device.

4. The device according to claim 1 wherein the device further comprises a pump arranged in order to reduce the pressure in the container when sealed.

5. The device according to claim 1 wherein the walls of the container are partly made of or coated with a hydrophobic material.

6. The device according to claim 1 wherein the hygroscopic material comprises molecular sieves, active carbon, zeolite, silica gel, LiCl, CaCl, $NaNO_3$, wood, sulphates or any suitable material having the capacity of absorbing water/moisture.

7. The device according to claim 1 wherein a fan or a pump facilitates a gas flow into the container.

8. The device according to claim 1 wherein the energy delivery device comprises a microwave generator or resistive heating device or a solar absorber unit.

9. The device according to claim 1 wherein the device also comprises a control mechanism for the opening and the sealing of the lid.

10. The device according to claim 1 wherein the device comprises a draining element.

11. The device according to claim 9 wherein the control mechanism is connected to the hygroscopic material and/or to the energy delivery device.

12. The device according to claim 1 wherein the walls of the container contains grooves, trenches, channels or the like.

13. The device according to claim 1, wherein the container further comprises a window.

14. The device of claim 1, wherein the energy delivery device has a Y or fork shape end part that is arranged in the hygroscopic material, and the end part of the energy delivery device heats the hygroscopic material.

15. The device of claim 1, wherein the energy delivery device has a flat rectangular surface shape end part that is arranged in the hygroscopic material, and the end part of the energy delivery device heats the hygroscopic material.

16. The device of claim 15, wherein the energy delivery device has an end part that comprises a plurality of wires, and metal conducting particles are arranged in the hygroscopic material, and the end part of the energy delivery device heats the hygroscopic material.

17. A method for extracting water from gas using a container comprising at least one opening, at least one hygroscopic material, at least one energy delivery device and at least one lid comprising:
- arranging the hygroscopic material in a frame, wherein the hygroscopic material is separated from walls of the container and surrounded by the gas, allowing water in the hygroscopic material to be vaporized to the surrounding gas when heated by an energy delivery device;
- providing the gas containing water to the container;
- absorbing water onto or into the hygroscopic material;
- sealing the container with the lid;
- heating the hygroscopic material with the energy delivery device arranged in the hygroscopic material until the gas in the container is saturated with water in gas phase;
- continuing to heat until the remaining absorbed water in the hygroscopic material liquefies without vaporizing first,
- wherein the walls of the container and the lid of the container are made of a heat conducting non-transparent material.

18. A device for extraction of water from gas comprising:
- a container made of a heat conducting non-transparent material and having check valve that is opened by a gas flow and closes when the gas flow stops, the check valve configured for connection, within an interior of a building, to an air conditioning or dehumidification arrangement for both daylight and night-time use of the device;
- a hygroscopic material located within the container; and
- an energy delivery device that heats the hygroscopic material, an end part of the energy delivery device is arranged in the hygroscopic material, the energy delivery device comprising a resistive metal wire that is arranged in the hygroscopic material and heats the hygroscopic material,
- wherein the hygroscopic material is arranged in a frame, and wherein the hygroscopic material is separated from walls of the container and surrounded by the gas, allowing water in the hygroscopic material to be vaporized to the surrounding gas when heated by the energy delivery device.

19. The device of claim 18, wherein the end part has a Y or fork shape.

20. The device of claim 18, wherein the end part has a flat rectangular surface shape.

21. The device of claim 18, wherein the end part comprises a plurality of wires and metal conducting particles are arranged with the hygroscopic material.

* * * * *